Aug. 10, 1926.

C. B. LONGSTRETH 1,595,106

COMBINED ICE CREAM CABINET AND REFRIGERATOR

Filed April 1, 1925

Inventor

Charles B. Longstreth.

By A. J. O'Brien

Attorney

Patented Aug. 10, 1926.

1,595,106

UNITED STATES PATENT OFFICE.

CHARLES B. LONGSTRETH, OF DENVER, COLORADO.

COMBINED ICE-CREAM CABINET AND REFRIGERATOR.

Application filed April 1, 1925. Serial No. 19,779.

This invention relates to improvements in ice cream cabinets and refrigerators.

In the storage of ice cream it is necessary that the containers shall be kept at a temperature well below freezing for if they are not the ice cream will become soft. This necessitates the employment of a freezing mixture of ice and salt which permits a temperature approaching zero to be obtained. It has therefore been customary to provide ice cream cabinets having a compartment large enough to contain several containers of ice cream and to pack ice and salt about the containers. The ice will, of course, gradually melt and produce a brine which has customarily been permitted to drain directly into the sewer. The brine as it leaves the compartment will have a low temperature and it is evident that it is well adapted to be employed as a cooling medium where somewhat higher temperatures are sufficient. Where milk, butter, eggs and meat are kept, the temperature should never fall below the freezing point as these articles do not need to be refrigerated to such low temperatures.

It is the object of this invention to produce a combined ice cream cabinet and a refrigerator wherein the chamber of the refrigerator portion shall have its temperature reduced by means of the brine that escapes from the ice cream cabinet.

My invention, briefly described, consists in a refrigerating device having two separate heat insulated compartments, one of which is adapted to serve as a holder for the ice cream cans and the freezing mixture. The other compartment is separated from the first by a wall of heat insulating material and has a double bottom and sides which form chambers through which the brine from the first compartment must flow before it escapes into the sewer. The cold brine serves as the refrigerant for the second compartment which may be used for storing milk, butter and other things that do not require a low temperature.

In order to describe my invention with more particularity and greater clearness, I shall have reference to the accompanying drawing in which I have illustrated the preferred embodiment thereof and in which—

Figure 1:
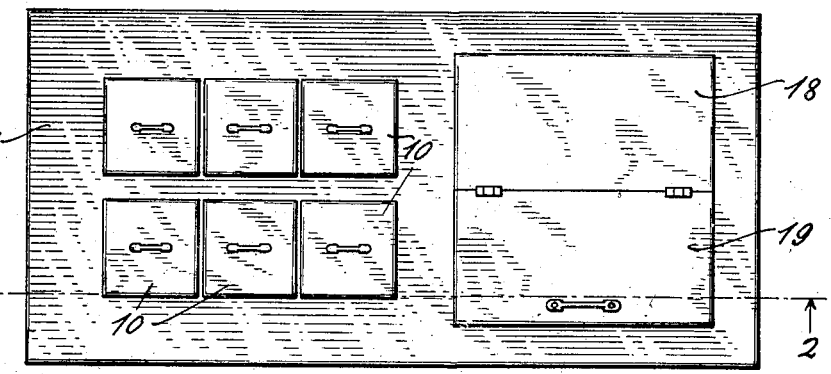
Fig. 1 shows a top plan view of my improved refrigerating device.
Figure 2:
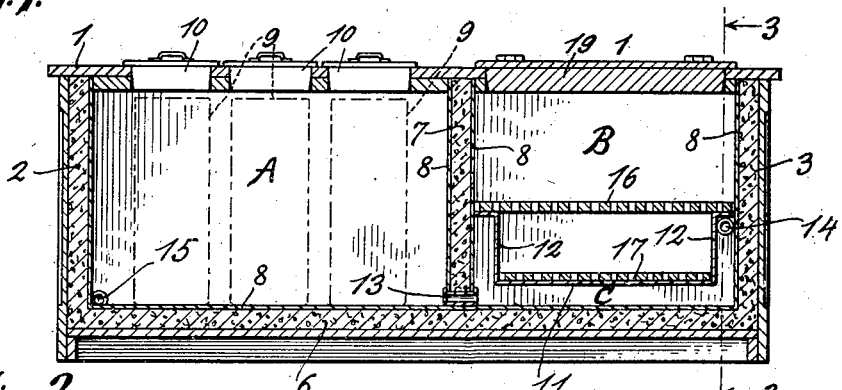
Fig. 2 is a section taken on line 2—2 Fig. 1.
Figures 3, 4:
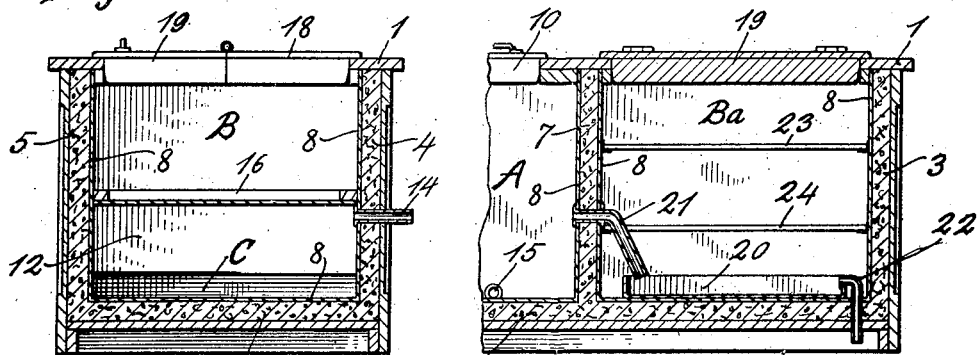
Fig. 3 is a section taken on line 3—3 Fig. 2.
Fig. 4 shows a sectional view of a modified form. The view corresponding to a section taken on line 2—2 Fig. 1.

I have illustrated a fixture having a top 1, ends 2, 3 sides 4, 5 and bottom 6, a transverse wall 7 separates the interior space into two compartments A and B. The interior of both compartments have a lining 8 of sheet metal, such as galvanized iron, zinc or copper. Compartment A has been shown as of the proper size to receive six ice cream containers 9 directly above each of which is a removable cover 10. The compartment B has a false bottom 11 and sides 12 that are spaced from the bottom and corresponding sides of the compartment. The bottom 11 and sides 12 form a box the upper edges of whose sides are bent outwardly and secured to the vertical sides of the compartment B, as by solder, so as to form a water tight space C. An opening 13 connects the interior of the compartment A with the space C so that the brine from compartment A will pass into and through the space C on its way to the outlet 14 through which it escapes. Compartment A is also provided with a drain 15 located near its bottom. This drain is usually plugged except when the entire compartment is to be drained as for example when it is cleaned. When the drain 15 is plugged, the brine escapes through the outlet 14 with the result that the space C is always practically full of brine which reduces the temperature in the compartment B which is so proportioned that the temperature never falls below freezing. The partition wall 7 is made of heat insulating material for if it were not the temperature within the chamber B would become too low. When the device is constructed in the manner explained, the compartment B will be dry as the brine is not exposed. Grates 16 and 17 may be provided in compartment B which is also provided with a cover comprising two hinged sections 18 and 19.

Where dry cold is not essential, the chamber corresponding to chamber B in Figs. 1 and 2 and designated as $B^a$ in Fig. 4 may merely be provided with a shallow pan 20 into which the brine overflows through the pipe 21 and from which it escapes through the pipe 22. This chamber may be provided with shelves 23 and 24.

It will be noted that in both of the embodiments described, I employ the brine from the compartment A for the purpose of cooling the chamber B thereby saving the ice that would otherwise be required to reduce the temperature of this chamber.

Having now described my invention, what I claim as new is:—

A combined ice cream cabinet and refrigerator comprising, in combination, a single box like casing having walls of heat insulating material, and a transverse partition wall, also of heat insulating material, which divides the casing into two compartments, each of said compartments having a water tight lining, one of said compartments being adapted to contain a freezing mixture comprising cracked ice and salt which forms a brine when the ice melts, the other compartment being provided with an inner box like member of the same shape as the compartment in which it is located but of smaller dimensions, said box like member having its bottom and sides spaced from the bottom and corresponding sides of the compartment and having its upper edge formed into an outwardly extending flange whose outer edge is secured to the inside of the compartment so as to form a water tight space about the box like member, said transverse partition having an opening into said space from the compartment containing the freezing mixture, the outer wall of the cabinet having an outlet opening from said water tight space to the outside, said outlet opening being located a short distance above the bottom.

In testimony whereof I affix my signature.

CHARLES B. LONGSTRETH.